US012693972B2

(12) United States Patent
Zinger et al.

(10) Patent No.:    US 12,693,972 B2
(45) Date of Patent:         Jul. 28, 2026

(54) DYNAMIC MAPPING OF NVME (NON-VOLATILE MEMORY EXPRESS) NAMESPACES TO HOSTS

(71) Applicant: Dell Products L.P., Round Rock, TX (US)

(72) Inventors: Eldad Zinger, Raanana (IL); Elad Grupi, Pardes Hana (IL); Amit Engel, Tel Aviv (IL)

(73) Assignee: Dell Products L.P., Round Rock, TX (US)

( * ) Notice:    Subject to any disclaimer, the term of this patent is extended or adjusted under 35 U.S.C. 154(b) by 0 days.

(21) Appl. No.: 18/978,309

(22) Filed:    Dec. 12, 2024

(65)             Prior Publication Data

US 2026/0169912 A1      Jun. 18, 2026

(51) Int. Cl.
*G06F 12/02*            (2006.01)
(52) U.S. Cl.
CPC .. *G06F 12/0246* (2013.01); *G06F 2212/7201* (2013.01)
(58) Field of Classification Search
CPC ..................... G06F 12/0246; G06F 2212/7201

USPC ......................................................... 711/103
See application file for complete search history.

(56)                   References Cited

U.S. PATENT DOCUMENTS

| 9,294,567 | B2 | 3/2016 | Hussain et al. | |
| 11,435,955 | B1 | 9/2022 | Venkatanarayanan et al. | |
| 11,989,461 | B2 | 5/2024 | Smith et al. | |
| 2019/0146675 | A1* | 5/2019 | Subramanian ............ | G06F 3/06 711/170 |
| 2020/0278893 | A1* | 9/2020 | Niell ..................... | G06F 9/4856 |
| 2021/0072927 | A1* | 3/2021 | Yang ..................... | G06F 9/5077 |

* cited by examiner

*Primary Examiner* — Gautam Sain
(74) *Attorney, Agent, or Firm* — BainwoodHuang

(57)                      ABSTRACT

An add host group mapping command is received that indicates a host group and a host to which the host group is to be mapped. The host group indicates an NVMe namespace that includes a boot drive that is used by the host to boot up. In response to the add group mapping command, the host group is mapped to the host by adding the host group to a host object corresponding to the host. The addition of the host group to the host object enables the host to subsequently access the NVMe namespace.

14 Claims, 7 Drawing Sheets

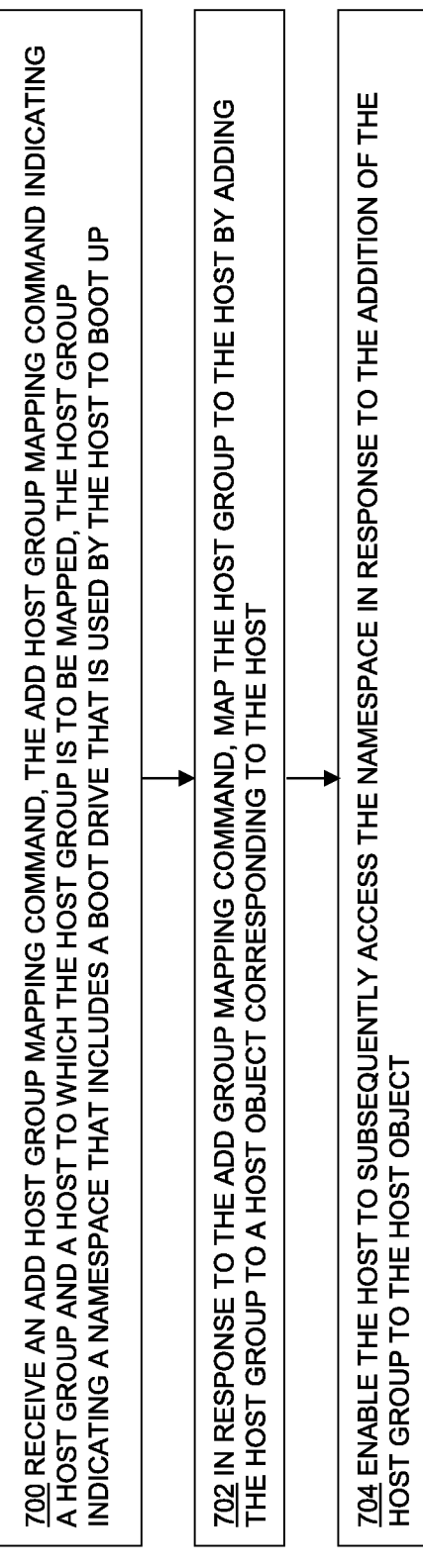

700 RECEIVE AN ADD HOST GROUP MAPPING COMMAND, THE ADD HOST GROUP MAPPING COMMAND INDICATING A HOST GROUP AND A HOST TO WHICH THE HOST GROUP IS TO BE MAPPED, THE HOST GROUP INDICATING A NAMESPACE THAT INCLUDES A BOOT DRIVE THAT IS USED BY THE HOST TO BOOT UP

702 IN RESPONSE TO THE ADD GROUP MAPPING COMMAND, MAP THE HOST GROUP TO THE HOST BY ADDING THE HOST GROUP TO A HOST OBJECT CORRESPONDING TO THE HOST

704 ENABLE THE HOST TO SUBSEQUENTLY ACCESS THE NAMESPACE IN RESPONSE TO THE ADDITION OF THE HOST GROUP TO THE HOST OBJECT

Fig. 7

DYNAMIC MAPPING OF NVME (NON-VOLATILE MEMORY EXPRESS) NAMESPACES TO HOSTS

TECHNICAL FIELD

This disclosure relates generally to technology that dynamically changes the NVMe (Non-Volatile Memory Express) namespace mappings of a host, and more specifically to technology for dynamically changing NVMe namespace mappings with regard to a host object data structure that is independently being accessed by host I/O request processing logic that checks the NVMe namespace mappings of hosts that issue host I/O requests.

BACKGROUND

Data storage systems are made up of hardware and/or software, and service host I/O requests received from physical and/or virtual host machines ("hosts"). Host I/O requests received by a data storage system specify user data that is written and/or read by the hosts. The data storage system executes software that processes the host I/O requests by performing various data processing tasks to organize and persistently store the user data in non-volatile data storage.

Non-Volatile Memory Express (NVMe) is a logical-device specification for accessing non-volatile data storage. An NVMe namespace is a collection of logical block addresses (LBAs) that may be made accessible to one or more hosts. An NVMe namespace is made accessible to a host by mapping that NVMe namespace to the host.

SUMMARY

In the disclosed technology, an add host group mapping command is received that indicates a host group and a host to which the host group is to be mapped. The host group indicates an NVMe namespace that includes a boot drive that is used by the host to boot up. In response to the add host group mapping command, the host group is mapped to the host by adding the host group to a host object corresponding to the host. The addition of the host group to the host object enables the host to subsequently access the NVMe namespace.

In some embodiments, adding the host group to the host object includes adding an indication of the host group to an array in the host object that stores an indication of another host group by storing the indication of the host group into an array entry in the array that follows an array entry that stores the indication of the other host group.

In some embodiments, after the host group is added to the host object and prior to indicating completion of the add host group mapping command, the disclosed technology ensures that all host I/O (Input/Output) request processing threads that are currently waiting to access the host object have accessed the host object with the indication of the host group having been added to the array in the host object.

In some embodiments, after the host group is added to the host object, the NVMe namespace is accessed by the host to access the boot drive in order to boot the host.

In some embodiments, a remove host group mapping command is received that indicates the host group and the host. In response to the remove host group mapping command, the disclosed technology removes the host group from the host object corresponding to the host by removing the indication of the host group from the array in the host object. The removal of the host group from the host object prevents the host from accessing the NVMe namespace.

In some embodiments, after the host group is removed from the host object, and prior to indicating completion of the remove host group mapping command, the disclosed technology ensures that each host I/O (Input/Output) request processing thread that has accessed the host object has completed and issued a response to the host.

The disclosed technology is a technical solution to the problem of dynamically mapping an NVME namespace that includes a host boot drive to a host without adversely impacting concurrently performed host I/O request processing. The disclosed technology advantageously operates without requiring a host I/O request processing thread to use a synchronization object such as a mutex, spinlock, or read/write lock in order to access a host object data structure. This is a significant performance consideration, since host I/O request processing threads must determine for each received host I/O request whether the host that issued the host I/O request is mapped to the namespace accessed by the host I/O request. Using the disclosed technology, host I/O request processing threads can concurrently access host objects to determine namespace mappings of individual hosts while those host objects are being modified. Host I/O request processing threads that need to access a host object are not suspended while the host object is being updated to add a namespace, and accordingly access to other namespaces is also not blocked during the update process. In addition, storing a host group indication (e.g. host group identifier) of a host group that enables access to a booting namespace into an array entry that follows another array entry that stores an indication of another host group provides higher performance to host I/O request processing threads that access namespaces other than the booting namespace.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 7 is a flow chart showing an example of steps performed in some embodiments.

DETAILED DESCRIPTION

Embodiments will now be described with reference to the figures. The embodiments described herein are provided only as examples, in order to illustrate various features and principles of the disclosed technology and are not limiting. The embodiments of the disclosed technology described herein are integrated into a practical solution for dynamically mapping and un-mapping an NVMe namespace that is accessed to boot a host while ensuring that concurrent host I/O request processing performance is not adversely impacted.

Embodiments of the disclosed technology operate by receiving an add host group mapping command that indicates i) a host group, and ii) a host to which the host group is to be mapped. The host group indicates an NVMe namespace that includes a boot drive that is used by the indicated host to boot up. In response to the add host group mapping command, the host group is mapped to the host by adding the host group to a host object data structure corresponding to the host. The addition of the host group to the host object enables the host to subsequently access the indicated NVMe namespace.

The host group may be added to the host object by adding an indication of the host group to an array in the host object. The array is further operable to store an indication of another host group. The indication of the host group may be added to the array by storing the indication of the host group in a predetermined array entry that follows another array entry in the array that is operable to store the indication of the other host group.

After the host group is added to the host object and prior to indicating completion of the add host group mapping command, the disclosed technology may ensure that all host I/O (Input/Output) request processing threads that are currently waiting to access the host object have accessed the host object with the indication of the host group having been added to the array in the host object.

After the host group is added to the host object and the add host group mapping command has completed, the NVMe namespace may be accessed by the host in order for the host to access the boot drive within the NVMe namespace in order to boot the host.

A remove host group mapping command may subsequently be received that indicates the host group and the host, e.g. after the host has completed booting. In response to the remove host group mapping command, the host group is removed from the host object corresponding to the host by removing the indication of the host group from the array in the host object. The removal of the host group from the host object prevents the host from being able to access the NVMe namespace.

After the host group is removed from the host object, and prior to indicating completion of the remove host group mapping command, the disclosed technology may ensure that each host I/O (Input/Output) request processing thread that has accessed the host object has completed and issued a response to the requesting host.

Figure 1:
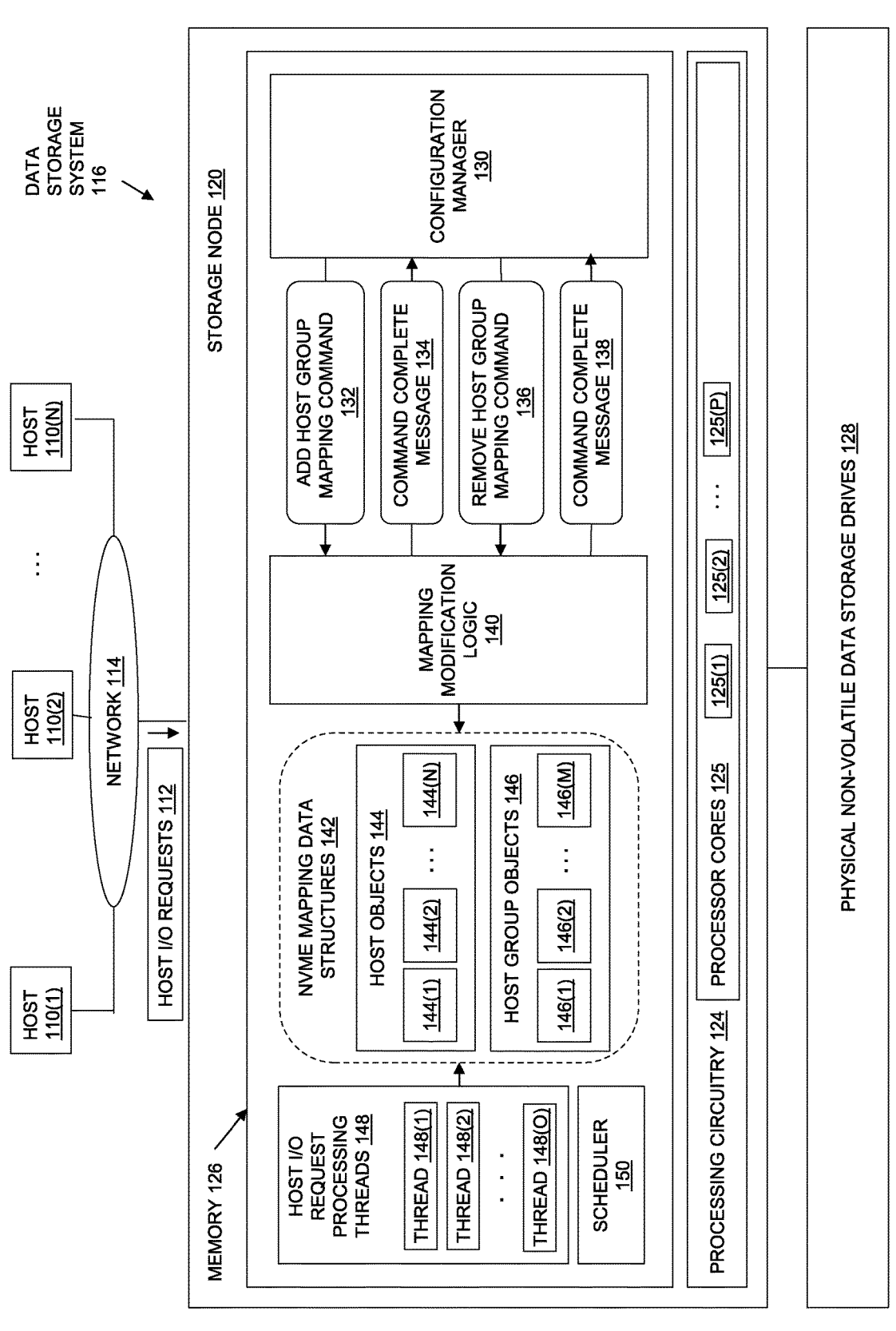
FIG. 1 is a block diagram showing an example of the disclosed technology in some embodiments.

FIG. 1 is a block diagram showing an operational environment for the disclosed technology, including an example of a Data Storage System 116 in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Node 120 that is communicably coupled to both Network 114 and Physical Non-Volatile Data Storage Drives 128, e.g. though one or more communication interfaces. No particular hardware configuration is required, and Storage Node 120 may be embodied as any specific type of device that is capable of processing host input/output (I/O) requests (e.g. I/O read requests and I/O write requests, etc.) and persistently storing host data.

Physical Non-Volatile Data Storage Drives 128 includes physical data storage drives such as solid-state drives, magnetic disk drives, hybrid drives, optical drives, and/or other specific types of drives.

Memory 126 stores program code that is executed on Processing Circuitry 124, as well as data structures generated and/or processed by such program code. Memory 126 may include volatile memory (e.g. RAM), and/or other types of memory.

Processing Circuitry 124 includes or consists of multiple processor cores. In the example of FIG. 1, a number of Processor Cores 125 are shown for purposes of illustration by Processor Cores 125(1) through 125(P). Each processor core includes or consists of a separate processing unit, sometimes referred to as a Central Processing Unit (CPU), and is capable of independently executing instructions.

Processing Circuitry 124 and Memory 126 together form control circuitry that is configured and arranged to carry out various methods and functions described herein. Memory 126 stores a variety of software components that may be provided in the form of executable program code and related data structures. For example, Memory 126 may include software components such as Configuration Manager 130, Mapping Modification Logic 140, NVMe Mapping Data Structures 142, Host I/O Processing Execution Threads 148, and Scheduler 150. When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

Data Storage System 116 provides one or more data storage services to Hosts 110. Host I/O Requests 112 include host I/O write requests that indicate host data that is to be stored by Data Storage System 116 in Physical Non-Volatile Data Storage Drives 128. Examples of data storage protocols that may be supported by Data Storage System 116 include without limitation Fibre Channel (FC) and Non-Volatile Memory Express (NVMe) protocols. Each one of the Host I/O Requests 112 includes a host identifier ("Host ID") indicating the host that issued the request, and an NVMe namespace identifier ("NSID") indicating the NVMe namespace that is accessed by the request.

During operation of the components shown in FIG. 1, when each one of the requests in Host I/O Requests 112 is received, it is assigned to one of the threads of execution in Host I/O Request Processing Threads 148 for processing. In the example of FIG. 1, Host I/O Request Processing Threads 148 includes "O" threads, shown by Thread 148(1) through Thread 148(O). Each thread is scheduled by Scheduler 150 for execution on one of the Processor Cores 125. When executed, each thread uses the host ID in a request to find the host object data structure in Host Objects 144 (e.g. one of host objects 144(1) through 144(N)) that corresponds to the host that issued the request. The thread then uses the contents of that host object to identify which host groups are currently mapped to the requesting host. Each host group mapped to a requesting host has a corresponding host object in Host Group Objects 146, e.g. one of host group objects 146(1) through 146(M). The host group object indicates the NVMe namespaces that are mapped to hosts to which the host group is mapped. In the case where the NVMe namespace accessed by a request is mapped to any host group that is mapped to the requesting host, that NVMe namespace is mapped to the requesting host, and the request completes successfully. In the case where the NVMe namespace accessed by the request is not mapped to any host group that is mapped to the requesting host, the NVMe namespace is not mapped to the requesting host, and the request fails.

In some embodiments, each one of the host objects 144(1) through 144(N) includes an array storing indications of the host groups that are currently mapped to the corresponding host. When a host I/O request processing thread accesses a host object of a host to determine whether an NVMe namespace accessed by a request issued by that host is currently mapped to it, the thread traverses the entries of the array in the host object. For each entry that indicates a host group currently mapped to the host (e.g. that contains a valid host group identifier), the thread checks the host group object corresponding to that host group to determine whether it indicates that the NVMe namespace accessed by the request is mapped to the requesting host. For example, in some embodiments, each host group object may include a bit map having set bits corresponding to each NVMe namespace that is mapped to hosts to which that host group is mapped, and the host I/O request processing thread accordingly checks the bit in the bit map that corresponds to the NVMe namespace that is accessed by the request. If the bit is set in the bit map of the host group object corresponding to any host group that is indicated by any entry in the array of the host object for the requesting host, then the NVMe namespace accessed by the request is accessible to the requesting host, and the request completes successfully. If the bit is not set in any bit map of the host group objects corresponding to the host groups indicated by the entries of the array, then the NVMe namespace accessed by the request is not accessible to the requesting host, and the request fails.

In this way, Host I/O Request Processing Threads 148 continuously access the host object and host group object data structures in NVMe Mapping Data Structures 142 in order to process Host I/O Requests 112. Mapping Modification Logic 140 concurrently accesses NVMe Mapping Data Structures 142 in order to modify the configurations of individual host objects and/or host group objects. Advantageously, access to NVMe Mapping Data Structures 142 by Mapping Modification Logic 140 does not adversely affect the performance of Host I/O Request Processing Threads 148, providing significant performance advantage for Data Storage System 116.

Further during the operation of the components shown in FIG. 1, Configuration Manager 130 issues Add Host Group Mapping Command 132 to Mapping Modification Logic 140. Configuration Manager 130 may, for example, issue Add Host Group Mapping Command 132 in response to a system management command that was issued by one of the Hosts 110, in order for that host to access its boot drive in order to boot up. Add Host Group Mapping Command 132 indicates i) a host group, and ii) a host to which the host group is to be mapped. The host group indicated by Add Host Group Mapping Command 132 indicates an NVMe namespace that is mapped to that host group, and that includes a boot drive that is to be used by the host to boot up. For example, Add Host Group Mapping Command 132 may include a host identifier of the host, and a host group identifier of the host group that is to be mapped to the host. The host identifier corresponds to one of the host objects in Host Objects 144, and the host group identifier corresponds to one of the host group objects in Host Group Objects 146. The bit map in the corresponding host group object has a set bit that corresponds to the NVMe namespace that includes the boot drive that is to be used by the host indicated in the Add Host Group Mapping Command 132 in order to boot up.

In response to receipt of Add Host Group Mapping Command 132, Mapping Modification Logic 140 maps the host group indicated by Add Host Group Mapping Command 132 to the host indicated by Add Host Group Mapping Command 132. For example, Mapping Modification Logic 140 may add an indication of the host group to the host object in Host Objects 142 that corresponds to the host indicated by Add Host Group Mapping Command 132. By adding the indication of the host group indicated by Add Host Group Mapping Command 132 to the host object corresponding to the host indicated by Add Host Group Mapping Command 132, Mapping Modification Logic 140 enables the host indicated by Add Host Group Mapping Command 132 to subsequently access the NVMe namespace that includes the boot drive that is used by the host to boot up.

In some embodiments, Mapping Modification Logic 140 adds the host group indicated by Add Host Group Mapping Command 132 to the host object corresponding to the host indicated by Add Host Group Mapping Command 132 by adding a host group identifier of the host group to an entry in an array contained in the host object. The array is operable to store indications of multiple host groups that are mapped to the host. Mapping Modification Logic 140 may add the host group indicated in the Add Host Group Mapping Command 132 to the host object by storing the host group identifier of that host group into an array entry that follows another array entry that stores or is operable to store an indication (e.g. host group identifier) of another, different host group. In this way, by using an array entry following another array entry that stores an indication of another host group, the disclosed technology enables host I/O request processing threads to access NVMe namespaces other than the NVMe namespace that includes the boot drive with relatively higher performance, since indications of those other NVMe namespaces can be quickly determined using a host group identifier located in an array entry that is checked before the entry that is used to store the host group identifier of the host group to which is mapped the NVMe namespace that includes the boot drive.

In some embodiments, Mapping Modification Logic 140 adds the identifier of the host group indicated by the Add Host Group Mapping Command 132 to an entry having a predetermined location (e.g. a predetermined index) within the array of the host object of the host indicated by the Add Host Group Mapping Command 132, e.g. to a second entry within the array. In such embodiments, the first array entry of the array is kept available to store an indication (e.g. host group identifier) of another host group.

Adding the indication of the host group to the host object makes the NVMe namespace accessible by the host, and therefore makes the boot drive within the NVMe namespace accessible in order to boot the host.

In some embodiments, after adding the indication of the host group to the host object, and prior to indicating completion of Add Host Group Mapping Command 132 by sending the Command Complete Message 134 to Configuration Manager 130, Mapping Modification Logic 140 performs a "synch" step that ensures that all host I/O (Input/Output) request processing threads that are currently waiting to access the host object have accessed the host object, with the host group identifier of the host group indicated by the Add Host Group Mapping Command 132 having been added to the array of the host object. To accomplish this, in some embodiments, Mapping Modification Logic 140 requests Scheduler 150 to indicate to Mapping Modification Logic 140 when the processor cores on which those host I/O request processing threads become available. At that time, when those processor cores become available, Mapping Modification Logic 140 knows that the host I/O processing threads executing on them have completed processing, and accordingly sends Command Complete Message 134 to Configuration Manger 130. Configuration Manager 130 may then send a command completed message to the host that issued the system management command, thus making the host aware that it can access the boot drive and boot up.

Configuration Manager 130 subsequently issues Remove Host Group Mapping Command 136 to Mapping Modification Logic 140. Configuration Manager 130 may, for example, issue Remove Host Group Mapping Command 136 in response to a system management command that was issued by the one of the Hosts 110 that issued the Add Host Group Mapping Command 132, after that host accessed its boot drive and has completed its boot up process. Remove Host Group Mapping Command 136 indicates i) the host group, and ii) the host to which the host group was previously mapped in response to Add Host Group Mapping Command 132. In response to Remove Host Group Mapping Command 136, Mapping Modification Logic 140 removes the host group from the host object corresponding to the host by removing the indication of the host group from the array in the host object. The removal of the host group from the host object prevents the host from being able to access the NVMe namespace that includes the boot drive of the host.

After Mapping Modification Logic 140 removes the host group from the host object, and prior to indicating completion of the Remove Host Group Mapping Command 136 by sending Command Complete Message 138 to Configuration Manager 130, Mapping Modification Logic 140 performs a "flush" step by waiting until each host I/O (Input/Output) request processing thread in Host I/O Request Processing Threads 148 that has accessed the host object has completed and has issued a response to the host that issued the request being processed. By waiting until all host I/O request processing threads have completed and issued responses before issuing Command Complete Message 138, Mapping Modification Logic 140 ensures that any host I/O request processing threads that started processing host I/O requests that were received before Remove Group Host Group Mapping Command 136 was processed, and that accordingly may or may not have accessed the host object before removal of the indication of the host group, are completed before the Command Complete Message 138 is sent to Configuration Manager 130. Upon receipt of the Command Complete Message 138, Configuration Manager 130 sends a command completed message to the host that issued the system management command to Configuration Manager 130 that caused Configuration Manager 130 to issue Remove Host Group Mapping Command 136.

Figure 2:
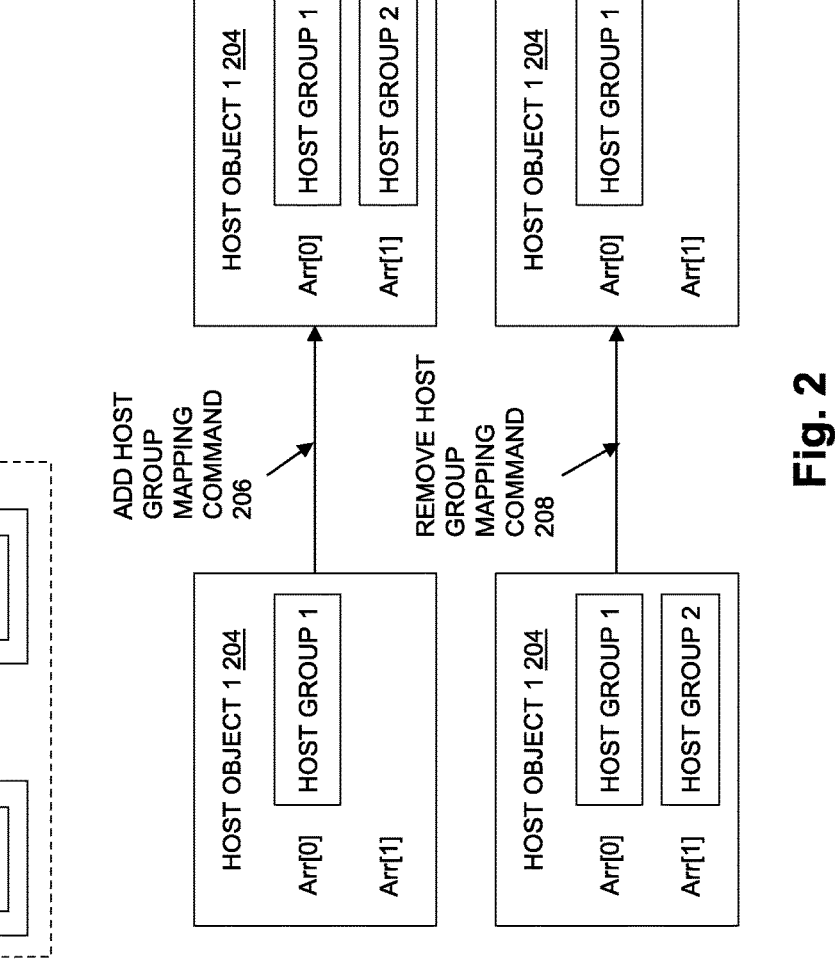
FIG. 2 is a block diagram showing examples of add host group and remove host group mapping command processing in some embodiments.

FIG. 2 is a block diagram showing examples of processing an add host group mapping command and a remove host group mapping command processing in some embodiments. Host Group Objects 200 include Host Group Object 1 202 (corresponding to Host Group 1), which is made up of a bit map having set bits for NVMe namespace 1 ("NS 1") and NVMe namespace 2 ("NS 2"), and a Host Group Object 2 203 (corresponding to Host Group 2), which is made up of a bit map having set bits for NVMe namespace 1 ("NS 1") and NVMe namespace 3 ("NS 3"). NVMe namespace 3 includes the boot drive for the host that corresponds to Host Object 1 204.

Host Object 1 204 includes an array "Arr[ ]" that stores indications of host groups that are currently mapped to the host. Prior to the processing of Add Host Group Mapping Command 206, array entry 0 ("Arr[0]") includes an indication (e.g. a host group identifier) of Host Group 1. The array entry following Arr[0] is Arr[1], which is empty prior to processing of Add Host Group Mapping Command 206. Prior to the processing of Add Group Mapping Command 206, the host has access only to NVMe namespace 1 and NVMe namespace 2, by way of the previous mapping of Host Group 1 to the host.

The processing of Add Host Group Mapping Command 206 causes an indication (e.g. a host group identifier) of Host Group 2 to be stored into Arr[1]. In some embodiments, whenever a host group that indicates an NVMe namespace that includes the boot drive for a host is added to the corresponding host object for purposes of booting the host, the indication of that host group is stored into a predetermined array entry (e.g. Arr[1]) that follows another array entry that is operable to store an indication of another host group (e.g. Arr[0]).

After the indication of Host Group 2 has been stored in Arr[1] by Add Host Group Mapping Command 206, the host is allowed to access NVMe namespace 3 in order to boot. When a host I/O request processing thread processes a host I/O request that is received from the host and that accesses NVMe namespace 3, the thread first checks the host group object corresponding to the host group indicated by Arr[0] (e.g. Host Group Object 1 202) and determines that NVMe namespace 3 is not mapped to Host Group 1. The host I/O request processing thread then checks the host group object corresponding to the host group indicated by Arr[1] (e.g. Host Group Object 2 203) and determines that NVMe namespace 3 is mapped to Host Group 2. Because NVMe namespace 3 is mapped to Host Group 2, and Host Group 2 is mapped to the host, the host is allowed to access NVMe namespace 3 in order to boot.

After the host has booted, Remove Host Group Mapping Command 208 is processed. Processing of Remove Host Group Mapping Command 308 removes the indication of Host Group 2 from Arr[1]. Removal of the indication of Host Group 2 from Arr[1] makes NVMe namespace 3 inaccessible to the host.

Figure 3:
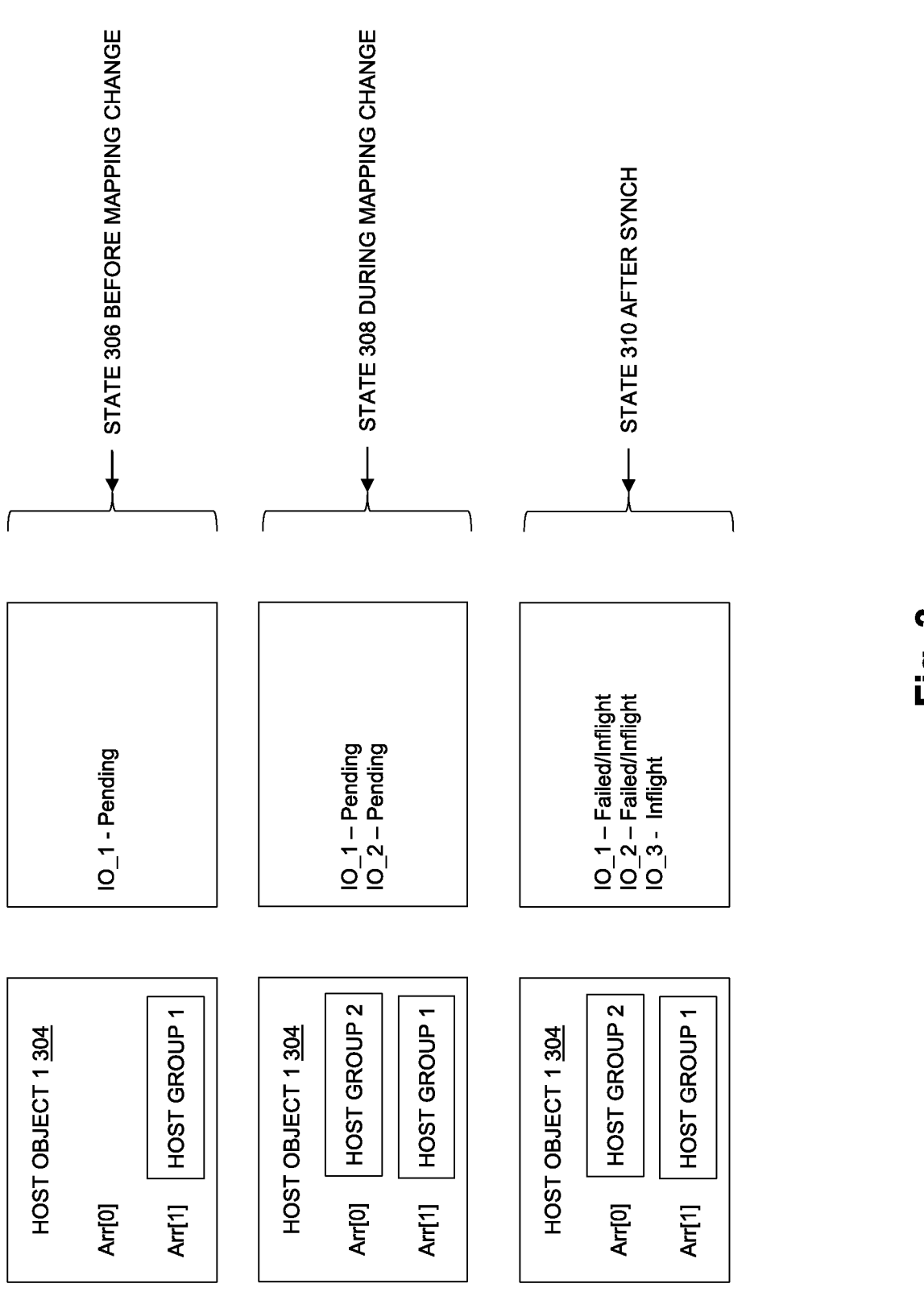
FIG. 3 is a block diagram showing an example of possible operational states during add host group mapping command processing in some embodiments.

FIG. 3 is a block diagram showing an example of possible operational states occurring during processing of an add host group mapping command processing in some embodiments. In the example of FIG. 3, an add host group mapping command is processed that provides the host corresponding to Host Object 1 304 with access to NVMe namespace 3 by storing an indication of Host Group 2 (e.g. the host group identifier for Host Group 2) into Arr[0]. Such an operation may be performed in the case where access to NVMe namespace 3 is being provided for purposes other than booting the host, e.g. to allow the host to edit the contents of the boot drive. Accordingly, in such a case, processing of the add host group mapping command stores the indication of Host Group 2 into Arr[0] instead of Arr[1].

In State 306, before processing of the add host group mapping command has started, a host I/O request "IO_1" that was received from the host and that accesses NVMe namespace 3 is pending. The host I/O request processing thread for IO_1 may access Host Object 1 304 before or after the indication of Host Group 2 is added to Arr[0], depending on when the host I/O request processing thread accesses Host Object 1 304.

Next, in State 308, while the indication of Host Group 2 is being added to Host Object 1 304, a host I/O request "IO_2" from the host and accessing NVME namespace 3 is also pending. Similar to IO_1, the host I/O request processing thread for IO_2 may access Host Object 1 304 before or after the addition of the indication of Host Group 2, depending on when the host I/O request processing thread accesses Host Object 1 304.

After State 308, and before State 310, a synch operation is performed that ensures that all host I/O (Input/Output) request processing threads that are currently waiting to access Host Object 1 304 have accessed Host Object 1 304 after the addition of the indication of Host Group 2. A command complete message is then generated.

Next, in State 310, after the indication of Host Group 2 has been added to Host Object 1 304, the synch operation has been performed, and a command complete message has been generated, a host I/O request "IO_3" is received from the host that accesses NVME namespace 3. The host I/O request processing thread for IO_3 has accessed Host Object 1 304 with the indication of Host Group 2 having been added and is accordingly in an "inflight" state. The "inflight" state of a host I/O request indicates that i) the processing of the host I/O request was successfully completed and ii) a response to the host I/O request has been generated and issued to the host. Further in State 310, the states of IO_1 and IO_2 may be either failed or inflight, depending on when the corresponding host I/O request processing threads access Host Object 1 304.

Figure 4:
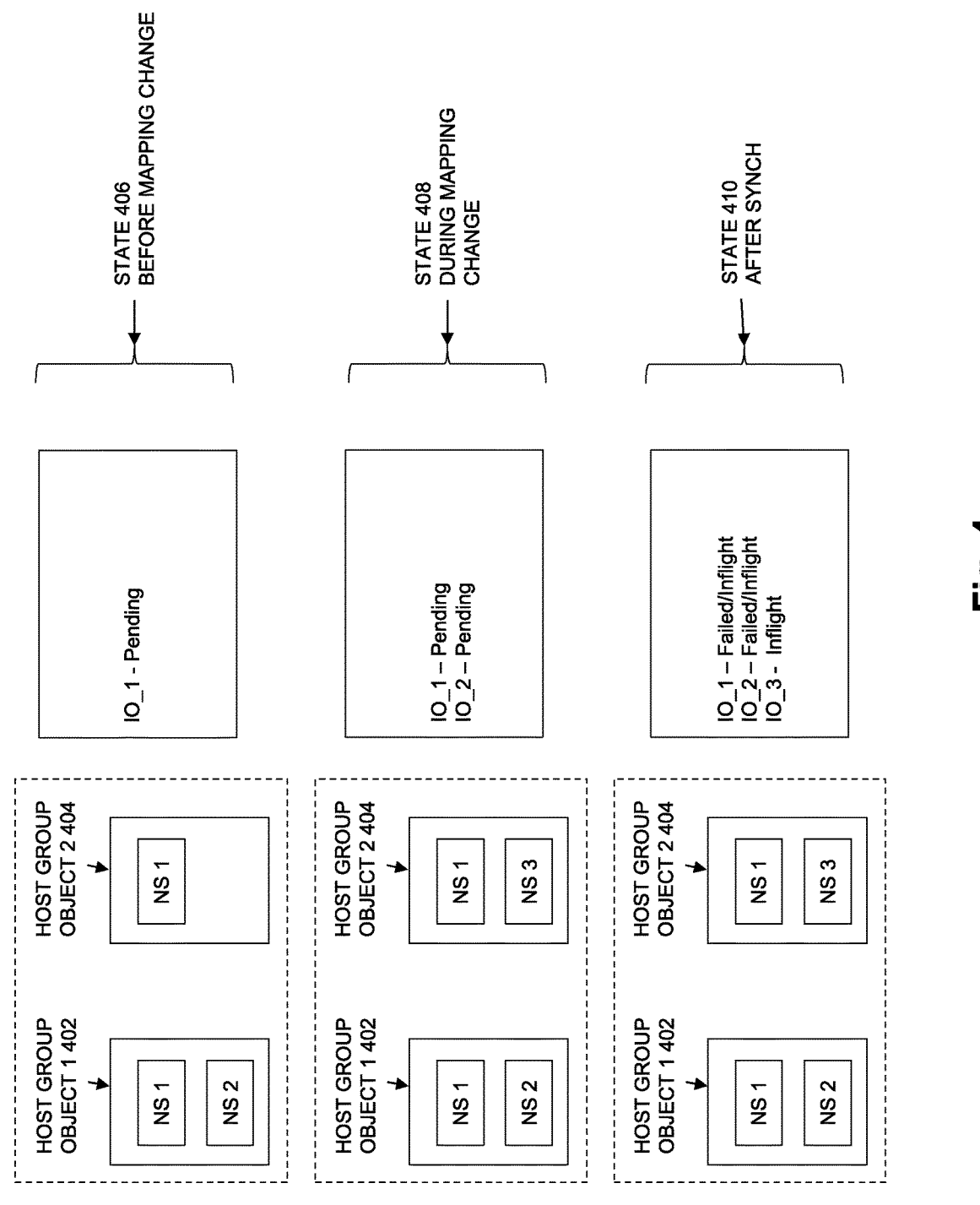
FIG. 4 is a block diagram showing an example of possible operational states during add namespace mapping command processing in some embodiments.

FIG. 4 is a block diagram showing an example of possible states during operation of some alternative embodiments while adding a namespace mapping to a host group object. In the example of FIG. 4, namespace 3 is made accessible to a host to which Host Group 1 (corresponding to Host Group Object 1 402) and Host Group 2 (corresponding to Host Group Object 2 404) have already been mapped, but namespace 3 was not previously mapped to Host Group 2. Accordingly, in the example of FIG. 4, NVMe namespace 3 is made available to the host by the mapping of namespace 3 to host group 2, i.e. by setting the bit corresponding to NVMe namespace 3 (e.g. the bit NS 3) in the bit map of the host group object Host Group Object 2 404.

In State 406, before bit NS 3 has been set in Host Group Object 2 404, a host I/O request "IO_1" that was received from the host and that accesses NVMe namespace 3 is pending. The host I/O request processing thread for IO_1 may or may not access Host Group Object 2 404 after bit NS 3 is set in Host Group Object 2 404, depending on when the host I/O request processing thread accesses Host Group Object 2 404.

Next, in State 408, while bit NS 3 of the host group object Host Group Object 2 404 is being set, another host I/O request "IO_2" from the host and accessing NVME namespace 3 is also pending. Similar to IO_1, the host I/O request processing thread for IO_2 may or may not access Host Group Object 2 404 after the NS 3 bit is set, depending on when the host I/O request processing thread accesses Host Group Object 2 404.

After State 408, and before entering state 410, a synch operation is performed that ensures that all host I/O (Input/Output) request processing threads that are currently waiting to access Host Group Object 2 404 have accessed Host Group Object 2 404, with the NS 3 bit having been set. A command complete message is then generated.

Next, in state 410, after NS 3 bit has been set in Host Group Object 2 404, the synch operation has been performed, and a command complete message was generated, a host I/O request "IO_3" is also received from the host that accesses NVME namespace 3. The host I/O request processing thread for IO_3 has accordingly accessed Host Group Object 2 404 after NS 3 has been set and is accordingly in an "inflight" state. Further in state 410, the states of IO_1 and IO_2 may be either failed or inflight, depending on when the corresponding host I/O request processing threads accessed Host Group Object 2 404.

Figure 5:
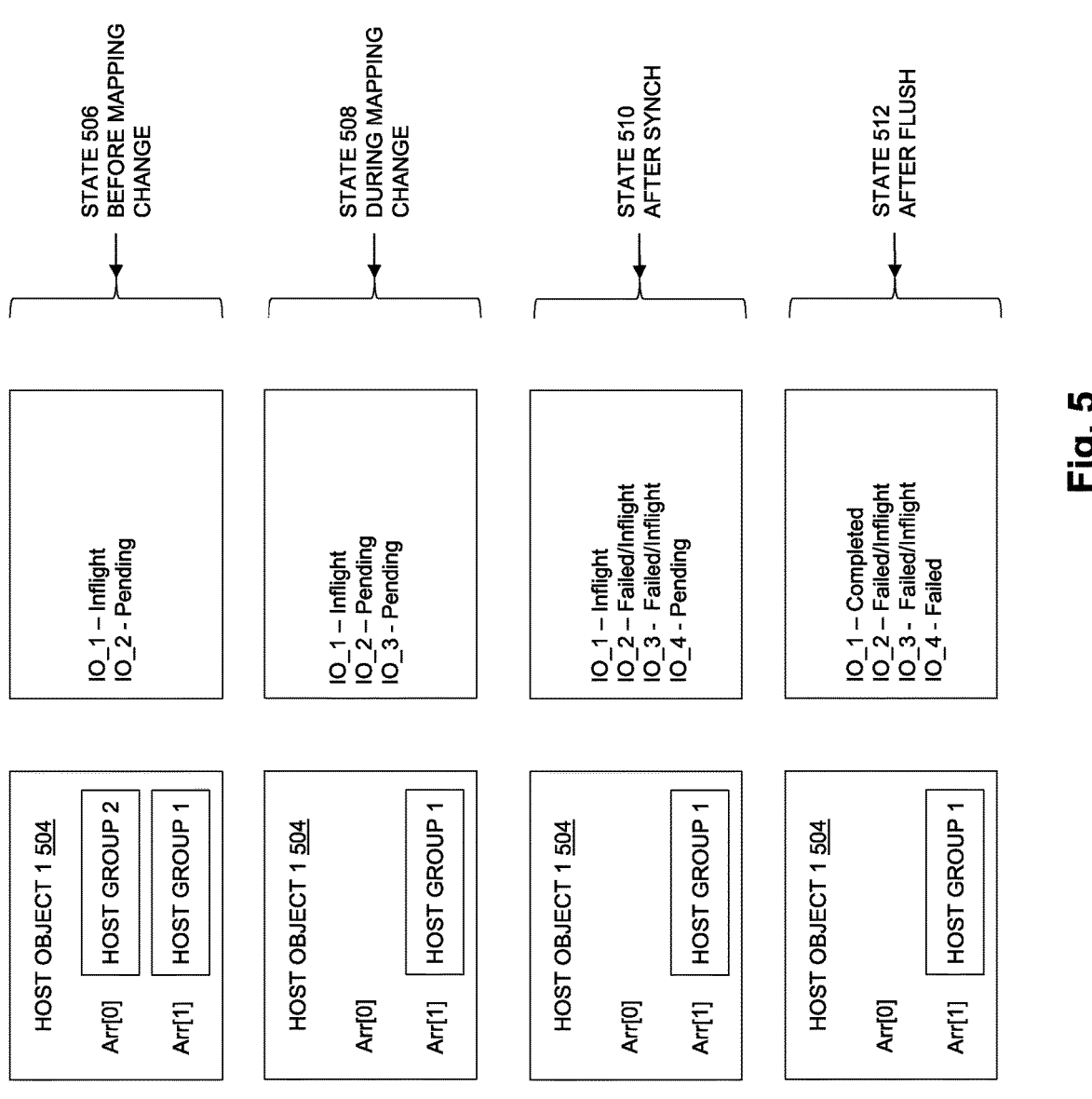
FIG. 5 is a block diagram showing an example of possible operational states during remove host group mapping command processing in some embodiments.

FIG. 5 is a block diagram showing an example of possible operational states occurring during processing of a remove host group mapping command in some embodiments. In the example of FIG. 5, a remove host group mapping command is processed that removes access to the NVMe namespace 3 for the host corresponding to Host Object 1 504 by removing the indication of Host Group 2 (e.g. the host group identifier for Host Group 2) from Arr[0].

In State 506, before processing of the remove host group mapping command has started, a host I/O request "IO_1" is inflight that was received from the host and that accesses NVMe namespace 3. The host I/O request processing thread for IO_1 accessed Host Object 1 504 before the indication of Host Group 2 was removed from Arr[0]. Also in State 506, a host I/O request "IO_2" that was received from the host and accesses NVMe namespace 3 has not yet accessed Host Object 1 504 and is pending.

In State 508, while the indication of Host Group 2 is being removed from Host Object 1 504, a host I/O request "IO_3" from the host and accessing NVME namespace 3 is also pending. Similar to IO_2, the host I/O request processing thread for IO_3 may access Host Object 1 504 before or after the removal of the indication of Host Group 2, depending on when the host I/O request processing thread accesses Host Object 1 504.

After State 508, and before State 510, a synch operation is performed that ensures that all host I/O (Input/Output) request processing threads that are currently waiting to access Host Object 1 504 have accessed Host Object 1 504 after the removal of the indication of Host Group 2.

In State 510, after the indication of Host Group 2 has been removed from Host Object 1 504 and the synch operation has been performed, another pending host I/O request "IO_4" is received from the host that accesses NVME namespace 3. The host I/O request processing thread for IO_3 will accordingly access Host Object 1 504 with the indication of Host Group 2 having been removed. Further in State 510, IO_1 is still inflight, and IO_2 and IO_3 are either inflight or failed, depending on when their I/O request processing threads accessed Host Object 1 504.

After State 510, and before State 512, a flush operation is performed that waits until each host I/O (Input/Output)

request processing thread that has accessed Host Object 1 504 has completed and has issued a response to the host that issued the request being processed. A command complete message is then generated.

Next, in state 512, after the flush operation has completed and a command complete message was generated, IO_1 has successfully completed, IO_2 and IO_3 have each either filed or are inflight depending on when their host I/O request processing threads accessed Host Object 1 504, and IO_4 has failed, since its host I/O request processing thread accessed Host Object 1 504 after the indication of Host Group 2 was removed.

Figure 6:
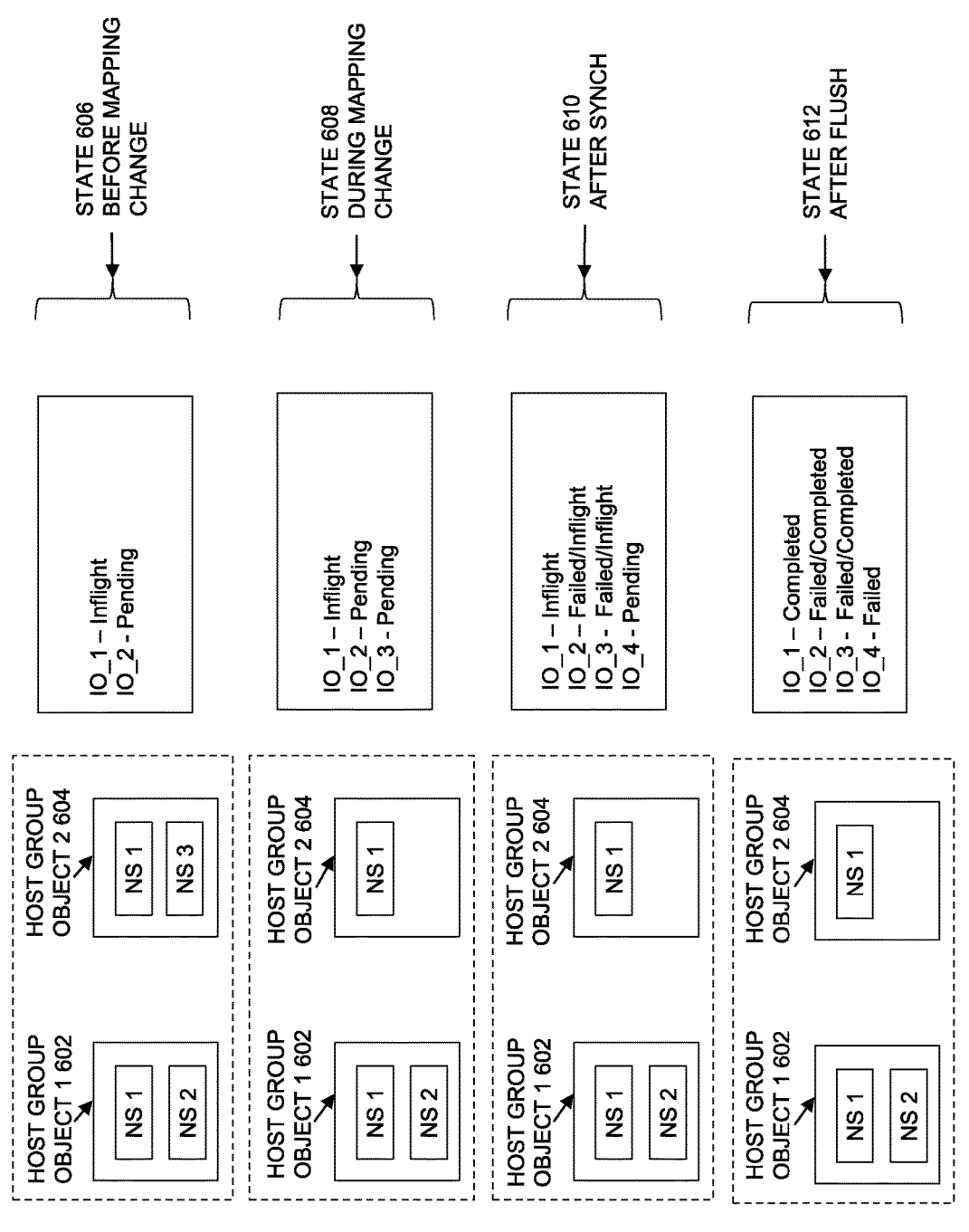
FIG. 6 is a block diagram showing an example of possible operational states during remove namespace mapping command processing in some embodiments.

FIG. 6 is a block diagram showing an example of possible states during operation of some alternative embodiments while removing a namespace mapping from a host group object. In the example of FIG. 6, access to NVMe namespace 3 removed from a host to which Host Group 1 (corresponding to Host Group Object 1 602) and Host Group 2 (corresponding to Host Group Object 2 604) have already been mapped, where NVMe namespace 3 was previously mapped to Host Group 2. Accordingly, access to NVMe namespace 3 is removed from the host by removing the mapping of namespace 3 to host group 2, i.e. by clearing the bit corresponding to namespace 3 (e.g. the bit NS 3) in the bit map of the host group object Host Group Object 2 604.

In State 606, before processing of the remove host group mapping command has started, a host I/O request "IO_1" is inflight that was received from the host and that accesses NVMe namespace 3. The host I/O request processing thread for IO_1 accessed Host Group Object 2 604 before bit NS 3 was cleared. Also in State 606, a host I/O request "IO_2" is pending that was received from the host and accesses NVMe namespace 3 but has not yet accessed Host Group Object 2 604.

Next, in State 608, while the bit NS 3 is being cleared in Host Group Object 2 604, a host I/O request "IO_3" from the host and accessing NVME namespace 3 is also received and pending. Similar to IO_2, the host I/O request processing thread for IO_3 may access Host Group Object 2 504 before or after the NS 3 bit has been cleared, depending on when the host I/O request processing thread accesses Host Group Object 2 604.

After State 608, and before State 610, a synch operation is performed that ensures that all host I/O (Input/Output) request processing threads that are currently waiting to access Host Group Object 2 604 have accessed Host Group Object 2 604 after the bit corresponding to NVMe namespace 3 (NS 3) has been cleared.

In State 610, after bit NS 3 has been cleared in Host Object Group Object 2 604 and the synch operation has been performed, a new pending host I/O request "IO_4" is received from the host that accesses NVME namespace 3. The host I/O request processing thread for IO_3 will accordingly access Host Group Object 2 604 with NS 3 having been cleared. Further in State 610, IO_1 is still inflight, and IO_2 and IO_3 are either inflight or failed, depending on when their I/O request processing threads accessed Host Group Object 2 604.

After State 510, and before State 512, a flush operation is performed that waits until each host I/O (Input/Output) request processing thread that has accessed Host Group Object 2 604 has completed and has issued a response to the host that issued the request being processed. A command complete message is then generated.

In state 512, after the flush operation has completed and the command complete message generated, IO_1 has successfully completed, IO_2 and IO_3 have each either filed or are inflight depending on when their host I/O request processing threads accessed Host Group Object 2 604, and IO_4 has failed, since its host I/O request processing thread accessed Host Group Object 2 604 after the bit corresponding to NVMe namespace 3 (NS 3) was cleared.

FIG. 7 is a flow chart showing an example of steps performed in some embodiments.

At step 700, an add host group mapping command is received. The add host group mapping command indicates a host group and a host to which the host group is to be mapped. The host group indicates a namespace that includes a boot drive that is used by the host to boot up.

At step 702, in response to the add group mapping command, the host group is mapped to the host by adding the host group to a host object corresponding to the host.

At step 704, the host is enabled to subsequently access the namespace in response to the addition of the host group to the host object.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

receiving an add host group mapping command, the add host group mapping command indicating a first host group and a host to which the first host group is to be mapped, wherein the host first group indicates a namespace that includes a boot drive that is used by the host to boot up;

in response to the add group mapping command, mapping the first host group to the host by adding the first host group to a host object corresponding to the host, wherein adding the first host group to the host object includes adding an indication of the first host group to an array in the host object that stores an indication of a second host group, and wherein adding the indication of the first host group to the array comprises storing the indication of the first host group into an array entry in the array that follows an array entry storing the indication of the second host group;

wherein the addition of the first host group to the host object enables the host to subsequently access the namespace; and after the first host group is added to the host object and prior to indicating completion of the add host group mapping command, ensuring that all host I/O (Input/Output) request processing threads that are currently waiting to access the host object have accessed the host object with the indication of the first host group having been added to the array in the host object.

2. The method of claim 1, further comprising after the first host group is added to the host object, allowing access to the namespace by the host in order to access the boot drive in order to boot the host.

3. The method of claim 1, further comprising:

receiving a remove host group mapping command, the remove group mapping command indicating the first host group and the host;

in response to the remove host group mapping command, removing the first host group from the host object corresponding to the host by removing the indication of the first host group from the array in the host object; and wherein the removal of the first host group from the host object prevents the host from accessing the namespace.

4. The method of claim 3, further comprising:

after the first host group is removed from the host object, and prior to indicating completion of the remove group mapping command, ensuring that each host I/O (Input/

Output) request processing thread that has accessed the host object has completed and issued a response to the host.

5. The method of claim 1, wherein the namespace comprises an NVMe (Non-Volatile Memory Express) namespace.

6. A data storage system comprising:

processing circuitry and memory coupled to the processing circuitry, the memory storing instructions, wherein the instructions, when executed by the processing circuitry, cause the processing circuitry to:

receive an add host group mapping command, the add host group mapping command indicating a first host group and a host to which the first host group is to be mapped, wherein the first host group indicates a namespace that includes a boot drive that is used by the host to boot up, in response to the add group mapping command, map the first host group to the host by adding the first host group to a host object corresponding to the host, wherein adding the first host group to the host object includes adding an indication of the first host group to an array in the host object that stores an indication of a second host group, and wherein adding the indication of the first host group to the array comprises storing the indication of the first host group into an array entry in the array that follows an array entry storing the indication of the second host group, wherein the addition of the first host group to the host object enables the host to subsequently access the namespace; and after the first host group is added to the host object and prior to indicating completion of the add host group mapping command, ensure that all host I/O (Input/Output) request processing threads that are currently waiting to access the host object have accessed the host object with the indication of the first host group having been added to the array in the host object.

7. The data storage system of claim 6, wherein the instructions, when executed by the processing circuitry, further cause the processing circuitry to:

after the first host group is added to the host object, allow access to the namespace by the host in order to access the boot drive in order to boot the host.

8. The data storage system of claim 6, wherein the instructions, when executed by the processing circuitry, further cause the processing circuitry to:

receive a remove host group mapping command, the remove group mapping command indicating the first host group and the host;

in response to the remove host group mapping command, remove the first host group from the host object corresponding to the host by removing the indication of the first host group from the array in the host object; and wherein the removal of the first host group from the host object prevents the host from accessing the namespace.

9. The data storage system of claim 8, wherein the instructions, when executed by the processing circuitry, further cause the processing circuitry to:

after the first host group is removed from the host object, and prior to indicating completion of the remove group mapping command, ensure that each host I/O (Input/Output) request processing thread that has accessed the host object has completed and issued a response to the host.

10. The data storage system of claim 6, wherein the namespace comprises an NVMe (Non-Volatile Memory Express) namespace.

11. A computer program product including a non-transitory computer readable medium having instructions stored thereon, wherein the instructions, when executed on processing circuitry, cause the processing circuitry to perform steps including:

receiving an add host group mapping command, the add host group mapping command indicating a first host group and a host to which the first host group is to be mapped, wherein the first host group indicates a namespace that includes a boot drive that is used by the host to boot up;

in response to the add group mapping command, mapping the first host group to the host by adding the first host group to a host object corresponding to the host, wherein adding the first host group to the host object includes adding an indication of the first host group to an array in the host object that stores an indication of a second host group, and wherein adding the indication of the first host group to the array comprises storing the indication of the first host group into an array entry in the array that follows an array entry storing the indication of the second host group;

wherein the addition of the first host group to the host object enables the host to subsequently access the namespace; and after the first host group is added to the host object and prior to indicating completion of the add host group mapping command, ensuring that all host I/O (Input/

Output) request processing threads that are currently waiting to access the host object have accessed the host object with the indication of the first host group having been added to the array in the host object.

12. The computer program product of claim 11, the steps further comprising after the first host group is added to the host object, allowing access to the namespace by the host in order to access the boot drive in order to boot the host.

13. The computer program product of claim 11, the steps further comprising:

receiving a remove host group mapping command, the remove group mapping command indicating the first host group and the host;

in response to the remove host group mapping command, removing the first host group from the host object corresponding to the host by removing the indication of the first host group from the array in the host object; and wherein the removal of the first host group from the host object prevents the host from accessing the namespace.

14. The computer program product of claim 13, wherein the namespace comprises an NVMe (Non-Volatile Memory Express) namespace, the steps further comprising:

after the first host group is removed from the host object, and prior to indicating completion of the remove group mapping command, ensuring that each host I/O (Input/Output) request processing thread that has accessed the host object has completed and issued a response to the host.

* * * * *